United States Patent
Huiberts

(10) Patent No.: US 10,524,610 B2
(45) Date of Patent: Jan. 7, 2020

(54) DEVICE FOR PREPARING BEVERAGES, PROVIDED WITH A STORAGE TANK

(71) Applicant: BRAVILOR HOLDING B.V., Heerhugowaard (NL)

(72) Inventor: Johannes Theodorus Emerentia Huiberts, Spanbroek (NL)

(73) Assignee: BRAVILOR HOLDING B.V., Heerhugwaard (NL)

( * ) Notice: Subject to any disclaimer, the term of this patent is extended or adjusted under 35 U.S.C. 154(b) by 363 days.

(21) Appl. No.: 15/102,575

(22) PCT Filed: Dec. 10, 2014

(86) PCT No.: PCT/NL2014/050847
§ 371 (c)(1),
(2) Date: Jun. 8, 2016

(87) PCT Pub. No.: WO2015/088339
PCT Pub. Date: Jun. 18, 2015

(65) Prior Publication Data
US 2017/0013995 A1    Jan. 19, 2017

(30) Foreign Application Priority Data
Dec. 10, 2013 (NL) .................... 2011928

(51) Int. Cl.
*A47J 31/46* (2006.01)
*A47J 31/40* (2006.01)

(52) U.S. Cl.
CPC ........... *A47J 31/467* (2013.01); *A47J 31/401* (2013.01)

(58) Field of Classification Search
CPC .... A47J 31/467; A47J 31/401; A47J 2203/00; A47J 31/061; A47J 31/40; A47J 31/408; A47J 31/42; A47J 31/505; A47J 31/60; A47J 42/50
USPC .................. 99/280, 279, 285, 286, 287, 290
See application file for complete search history.

(56) References Cited

U.S. PATENT DOCUMENTS

| | | | |
|---|---|---|---|
| 3,671,020 | A | 6/1972 | Krup |
| 6,339,985 | B1 | 1/2002 | Whitney |
| 7,182,017 | B1 | 2/2007 | Knepler et al. |
| 2011/0086148 | A1 | 4/2011 | Ford |

FOREIGN PATENT DOCUMENTS

| | | |
|---|---|---|
| CN | 102083344 A | 6/2011 |
| DE | 296 11 088 U1 | 1/1997 |
| EP | 1 550 391 A | 6/1972 |
| WO | 98/27852 A1 | 7/1998 |

OTHER PUBLICATIONS

International Search Report, dated Feb. 16, 2015, from corresponding PCT application.

*Primary Examiner* — Phuong T Nguyen
(74) *Attorney, Agent, or Firm* — Young & Thompson

(57) ABSTRACT

A device (1) for preparing a beverage includes an outlet opening (15) which flows into a storage tank (6) provided with a dispenser (17) for dispensing the beverage into a container. A control unit (7) supplies the beverage to the storage tank (6) in response to a signal from an operating unit (9) for at least two consecutive preparation cycles (B1, B2). The volume of the beverage prepared in at least two consecutive preparation cycles is supplied in a more or less constant and uninterrupted flow via the dispenser (17) of the storage tank (6) to the container.

12 Claims, 2 Drawing Sheets

DEVICE FOR PREPARING BEVERAGES, PROVIDED WITH A STORAGE TANK

FIELD OF THE INVENTION

Figure 1:
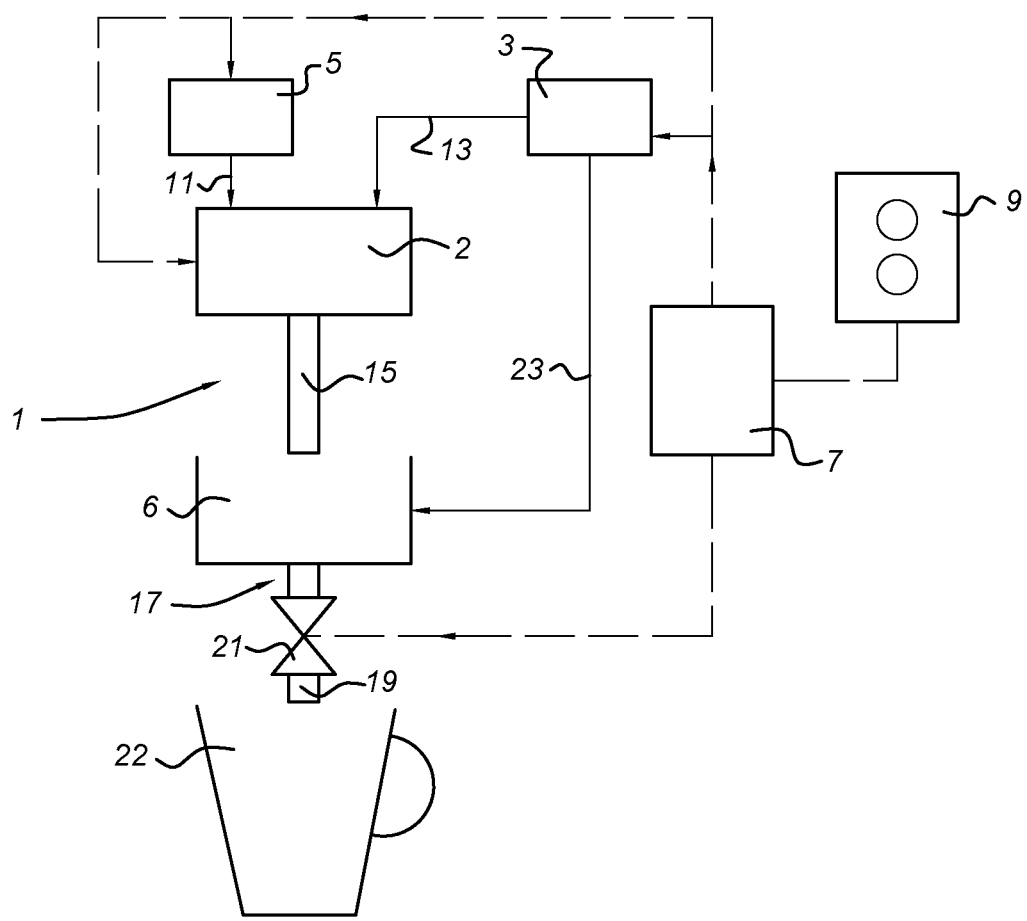

The invention relates to a device for preparing a beverage with a preparation unit with a supply for a load of ground coffee or water soluble powder or beverage concentrate, a water supply and an outlet opening, a control unit connected with the preparation unit for the following, in at least two consecutive preparation cycles:
 loading the preparation unit with ground coffee, soluble powder or beverage concentrate,
 supply of water to the preparation unit, and
 dispensing beverage through the outlet opening, as well as an operating unit connected with the control unit for receiving user input, where the outlet flows into a storage tank that has a delivery component for dispensing the beverage to a container, The invention also involves a process for preparing drinks.

BACKGROUND OF THE INVENTION

Beverage preparation devices for preparing instant beverage or for preparing coffee from an extract or from ground beans are known where ground coffee or water soluble powder or a beverage concentrate is brought into contact with hot or cold water in a preparation unit. The brewing unit can for instance include a filter ground coffee preparation unit through which hot water is supplied. It is also possible for the brewing unit to include a container that compresses the charge of ground coffee into a coffee bed through which hot water, pressurised for example by between 1-10 bar, is forced through to prepare espresso coffee. The preparation unit can also receive instant powder for preparing a beverage and a mixing device for dissolving the powder in a volume of water supplied to the preparation unit.

The user instructs the control unit via a control unit, which may include multiple buttons, as to which type of drink and the quantity that should be dispensed by the preparation unit to a container, such as a cup or jug. If larger quantities of beverage are required to be dispensed, the user can leave the container under the outlet of the preparation unit for several consecutive preparation cycles. The downside is that the moment when the final amount of beverage is dispensed, is unclear for the user and that there is a pause between consecutive preparation cycles that gives the impression that the beverage delivery has ended. Early removal of the container by the user can, if the next preparation cycle commences, give rise to spills and beverage release outside the container.

An alternative to preparing larger quantities of drink is the use of a preparation unit with a larger content. This allows the volume of the beverage dispensing device to increase to unwanted dimensions and to become too large for certain applications. The technique is also known where electrically controlled valves are installed in the hot water and cold water supply lines of the preparation unit, as well as in the drain in order to prepare different volumes of beverage in the preparation unit. However, these valves are prone to malfunctions and are maintenance intensive.

A beverage preparation device according to the introduction of claim 1 is known from WO98/27852. This publication described a dispensing device for a post-mix multiple station in which the prepared beverage is stored in a storage tank. When beverage is drawn from the storage tank beverage, the level of the liquid is measured by sensors and when a predefined set level is reached, new beverage is supplied to the storage tank.

The known device has the disadvantage that the time the drink remains in the storage tank can be relatively long, whereby the quality of the beverage is adversely affected. The taste of coffee is very susceptible to the storage time and the known device is unsuitable for issuing of fresh coffee. The temperature of cold or hot beverages can also fluctuate unacceptably due to the time spent in the storage tank.

In view of the above, the intention of the invention is to provide a device for preparing beverages in with which both small and larger amounts of beverage can be dispensed to a user in a fool proof way, without adversely affecting the quality of the beverage. It is a further intention of the invention to provide a device in which the preparation unit has a relatively compact size and where the use of malfunction-prone valves is avoided.

SUMMARY OF THE INVENTION

To this end, a beverage preparation device according to the invention is characterised by the fact that a user can enter a relatively small or a relatively large consumption volume through the control unit, where the control unit, every time a large consumption volume is selected, operates the water supply device and the preparation unit for at least two consecutive preparation cycles (B1, B2) in such a way that a large consumption volume of beverage is supplied to the storage tank and where the entire content of the storage tank must be dispensed to the container at such a flow rate or after a specific time after the commencement of such dispensing of beverage from the preparation unit in the first preparation cycle, that the volume of the beverage of at least two consecutive preparation cycles is supplied to the container in a virtually constant and uninterrupted flow via the dispenser of the storage tank.

By sending all prepared beverage via the storage tank to the container with the selection of a big or a small beverage consumption volume, it is possible to supply the user with both a relatively small and a relatively large amount of freshly prepared beverage, for example, 0.4 litre, in a continuous flow, under any circumstances. After a consumption volume is selected, the beverage is freshly prepared and supplied to the storage tank, all to be dispensed to the container (jug or can) from there, so the taste and temperature will be retained at its best. The uninterrupted beverage flow with the selection of a large consumption volume is a clear indication for the user that the beverage dispensing cycle is not yet complete and prevents the user from removing the container too soon from under the outlet opening. Furthermore, by using the storage tank according to the invention that does not exceed a predefined consumption volume, such as for example a jug with contents of 0.5-1 litre, the preparation unit and thus the size of the device, can remain compact. The shape of the storage tank can be adjusted with a given volume to the space that is available in the beverage preparation devices Thus, the storage tank in a horizontal section at the level of the brewing unit may have a half-moon shaped form in order to be clicked in at the bottom of a cylindrical brewing unit. Further down, the storage tank could then have a more square shape. By determining the shape of the storage tank, existing beverage preparation devices may be adapted by adding a storage tank with the desired shape and content, to dispense larger volumes of beverage without having to adjust the external design. In addition, with the application of the storage tank, the number of malfunction-prone parts in the device according to the invention will remain limited.

The preparation unit can include a mixing device for mixing a powdered instant beverage with water, or for mixing a concentrate with water. The beverage can be coffee, soup, instant cool drink or any other hot or cold beverages. It is preferred that the preparation unit includes a container to receive coffee beans ground in a grinding device, that will create a loose or compressed coffee bed through which water, whether or not under pressure, is guided through to make freshly brewed coffee, which is then collected in the liquid reservoir.

Depending on the beverage volume entered in the operating unit by the user, the beverage is added to the container via the storage tank during two or more preparation cycles. The dispensing part of the storage tank can be formed by a rigid or flexible pipe with a constant, relatively small diameter which is such that the beverage flow rate from the storage tank is relatively small and such that the storage tank will not run dry between successive preparation cycles, but will provide an uninterrupted beverage supply.

In one embodiment, the dispenser is provided with a valve connected to the control unit. This valve can be set by the manufacturer or the operator of the beverage dispensing device to a predefined, fixed opening position, assumed when the user enter a selection in the operating unit, via the control unit at the start of the first cycle of preparation. Alternatively, the valve can adopt one of a number of different opening positions each time, depending on the user's selection, as directed by the control unit.

In a further embodiment, the valve and the control unit is designed in such a way that the valve is closed at the start of the first preparation cycle and it is opened by the control unit at a later time. The storage tank is thus filled with beverage during storage time and the beverage is released from the storage tank with some delay, for example during the second preparation cycle (for instance shortly before the end of the second preparation cycle). The beverage can be treated during the storage time in the storage tank, for example by chilling, by heating or by additional contact time of the dissolved ingredients of the the beverage with the water. It is also possible to add extra water or other ingredients to the beverage in the storage tank during the standing time.

In a further embodiment, the dispenser remains open from the time of dispensing the beverage from the preparation unit in the preparation cycle and the dispenser has a diameter that is such that the storage tank is not emptied by the liquid flow from the storage tank to the container, at least not until the moment of dispensing into the storage tank in the second preparation cycle.

The dispenser may have an adjustable diameter. This diameter can be adjusted, for example by an adjustable restriction, for example by means of a screw or tap. Alternatively, an adjustable restriction is achieved because the dispenser includes a flexible hose and an adjustable hose clamp mechanism gripping on the hose. The valve may be adjustable via the control unit on a predefined fixed opening of the dispenser.

A water supply can be connected to the storage tank to supply hot and cold water to the storage tank. This allows the beverage volume supplied by the storage tank to be increased additionally, to volumes that exceed the volume of two consecutive preparation cycles. This is for example an advantage if a greater beverage volume should be dispensed. The temperature and concentration of the prepared beverage can also easily be adjusted with the water supply to the storage tank.

SHORT DESCRIPTION OF THE DRAWINGS

Figure 2:
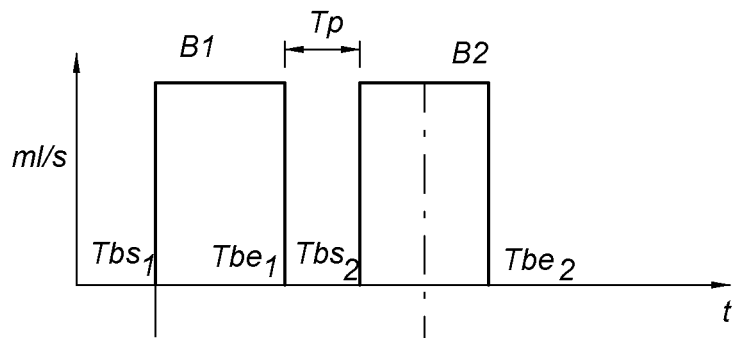
Figure 3:
Figure 4:
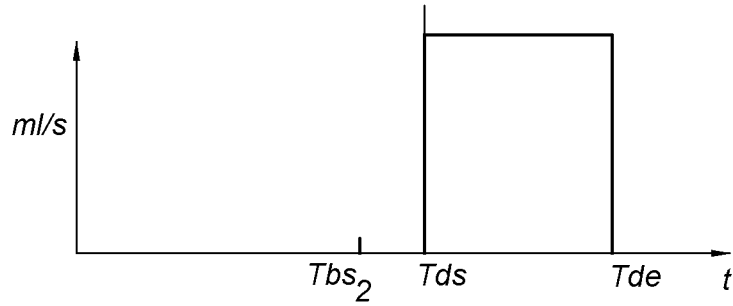

An embodiment of a device according to the invention, will be further explained by way of example, on the basis of a number of non-restrictive drawings. In the drawings, the following shows:

FIG. 1 a schematic representation of an embodiment of a device for preparing beverages according to the invention, Fig. 2 is the time diagram of the dispensing of the beverage from the preparation unit to the storage tank, and FIG. 3 and FIG. 4 different time diagrams of beverage dispensing from the storage tank to the container.

DETAILED DESCRIPTION OF THE INVENTION

FIG. 1 shows a device 1 for the preparation of beverages using a preparation unit 2, a water reservoir 3 connected with this, a grinding device 5 for coffee beans, a storage tank 6, a control unit 7 and an operating unit 9. The water reservoir 3 can be connected with a heating element, not shown in the drawing, in the form of a submersible element or a flow-through heater. This allows hot water through the water inlet pipe 13 to be supplied to the preparation unit 2. Ground coffee or "coffee meal" is added via a supply 11, to the preparation unit 2. The ground coffee is collected in the preparation unit 2. The ground coffee is placed in a loose packing in the preparation unit for the preparation of filter coffee. It is also possible to make espresso coffee with this device, in which case the ground coffee is compressed into a coffee bed. It is also possible to add the coffee to the preparation unit 2 in the form of 'coffee pads" or capsules Hot water is supplied to the preparation unit 2 from the water reservoir 3 via a water inlet pipe 13, and this water is supplied through the coffee bed and coffee extract is supplied via an outlet opening 15 to the storage tank 6.

The storage tank 6 is provided with a dispensing unit 17 that consists of a tube 19 and valve 21. The dispensing unit 17 releases the coffee from the storage tank 6 to a user's container 22. A possible embodiment of the valve 21 is a clamping mechanism that grips onto a flexible hose 19.

A water supply 23 links the water reservoir 3 with the storage tank 6. Hot or cold water can be supplied from the water reservoir 3 to the storage tank 6.

A control unit 7 is connected to a pump and/or valve of the water reservoir 3, with the grinding device 5, with the preparation unit 2 and with the valve 21 to signal the start of the coffee bean grinding, feeding the ground coffee into the preparation unit 2, the start of the preparation cycle and the opening and closing of the valve 21. Via an operating unit 9, a user can enter the required type of beverage or the required volume of beverage required from the control unit 7.

A maximum amount of ground coffee can be placed in preparation unit 2, and no more than the maximum volume of beverage can be prepared in a preparation cycle. If a user enters a beverage volume in operating unit 9 which exceeds the maximum for the preparation unit 2, the control unit 7 will initiate two consecutive preparation cycles B1 and B2 of the preparation unit. This is displayed in FIG. 2.

During the first preparation cycle B1, beverage is dispensed from preparation unit 2 to storage tank 6. After the first preparation cycle, which ends at time Tbe1, the preparation unit 2 is emptied at interval Tp, used coffee grounds are discharged from unit 2 and freshly ground coffee is added to the unit. Consecutively, preparation cycle B2 starts at time Tbs2 and the coffee in preparation cycle B2, which ends at time Tbe2, is added to storage tank 6.

As displayed in FIG. 3, control unit 7 can immediately at the time Tbs1 at the commencement of the first preparation cycle B1, open valve 21 to a relatively small opening so beverage can immediately be dispensed into container 21. The volume of beverage which is released from storage tank 6 via the dispensing unit 17 is set so low that the storage tank 6 will not be emptied during the first and second preparation cycle B1 and B2 and the intermediate interval Tp.

It is possible to achieve the continuous supply indicated in FIG. 3 from the storage tank 3 by fitting a fixed restriction in hose 19, instead of fitting a valve 21, for instance in the form of a ring seal, or by selecting a specific hose 19 diameter.

Alternatively, as indicated in FIG. 4, the control unit 7 opens the valve 21 at time Tds. This time Tds can be located after the starting point Tbs1 of the first preparation cycle B1, and is preferably during the second preparation cycle B2. After opening the valve 21, the coffee is supplied with a relatively large flow rate from the storage tank 6 to the container 21, so that the storage tank is emptied at a time Tde—shortly after the moment Tbe2 of termination of the second preparation cycle B2—and the valve 21 can be closed.

The beverage volume prepared in the two consecutive cycles in the preparation unit 2 is equal to the volume of beverage dispensed from the storage tank 6. This implies that the surface under the two consecutive preparation cycles in FIG. 2 is equal to the surface of the dispensing cycle in FIG. 3 or FIG. 4.

Hot or cold water can be supplied through the water pipe 23 to the storage tank 6, so that the total volume of beverage supplied from storage tank 6 exceeds the volume of beverage added during two consecutive preparation cycles B1 and B2 to the storage tank 6.

The invention claimed is:

1. A device (1) for freshly preparing a beverage, comprising:
    a preparation unit (2) with a supply (11) for receiving a charge of ground coffee or water soluble powder or beverage concentrate and with an outlet opening (15) for prepared beverage;
    a water supply device (3, 13) for supplying water to the preparation unit;
    a storage tank (6) that is provided with a dispenser (17) for dispensing the beverage into a container, wherein the outlet opening (15) debauches into the storage tank (6);
    a control unit (7) connected with the preparation unit (2) for carrying out, in at least two consecutive preparation cycles (B1, B2), the steps of:
        charging of the preparation unit (2) with ground coffee, beverage powder or beverage concentrate,
        supply of water to the preparation unit (2), and
        dispensing beverage through the outlet opening (15) into the storage tank (6),
    wherein the at least two consecutive preparation cycles comprise a first preparation (B1) cycle and a second preparation cycle (B2), wherein a non-zero intermediate time interval (Tp) is provided between the first and the second preparation cycles;
    an operating unit (9) that is connected to the control unit (7) and is adapted to receive user input, wherein the control unit (7) is adapted for receiving, via the operating unit (9), a user input which selects a relatively small or a relatively large consumption volume, wherein the relatively small consumption unit does not exceed a maximum volume of beverage being prepared in the preparation unit in a single preparation cycle, and wherein the relatively large consumption volume exceeds the maximum volume of beverage being prepared in the preparation unit in a single preparation cycle,
    wherein the control unit, every time the relatively large consumption volume is selected, operates the water supply device (3,13) and the preparation unit (2) for at least two consecutive preparation cycles (B1, B2), with a non-zero intermediate time interval between said consecutive preparation cycles, in such a way that the relatively large consumption volume of beverage is supplied to the storage tank (6) and wherein the entire content of the storage tank (6) is dispensed to the container at such a flow rate or after a specific time (Tds) after the time (Tbs1) of commencement of dispensing of beverage from the preparation unit (2) to the storage tank (6) in the first preparation cycle (B1), that the volume of the freshly prepared beverage formed in at least two consecutive preparation cycles (B1,B2) is supplied to the container in a virtually constant and uninterrupted flow via the dispenser (17) of the storage tank (6), wherein a time of commencement of dispensing beverage from the storage tank (6) to the container is prior to the end (Tbe2) of the second preparation cycle (B2) of the at least two preparation cycles (B1, B2); and
    wherein between the time of commencement (Tbs1) of the first preparation cycle (B1) and the time the storage tank (6) is completely emptied, the total volume of beverage in the storage tank remains smaller than the volume of the freshly prepared beverage formed in the two consecutive preparation cycles.

2. The device (1) for preparing a beverage according to claim 1, wherein the dispenser (17) contains a shutoff valve (21) connected to the control unit (7).

3. The device (1) according to claim 2, wherein the shutoff valve (21) is closed at the commencement (Tbs1) of the first preparation cycle, and it is opened at a later time (Tds) by the control unit (7).

4. The device (1) according to claim 2, wherein the dispenser (17) remains open from the time the beverage is dispensed from the preparation unit (2) in the first preparation cycle (B1) and has a diameter of such a measurement that the storage tank is not emptied due to the flow of liquid from the storage tank (6) to the container, at least up to the time (Tbs2) the beverage is dispensed to the storage tank in the second preparation cycle (B2).

5. The device (1) according to claim 3, wherein the time (Tds) the shutoff valve (21) opened is after the completion time (Tbe1) of the first preparation cycle (B1).

6. The device (1) according to claim 1, wherein the dispenser (17) remains open from the time the beverage is dispensed from the preparation unit (2) in the first preparation cycle (B1) and has a diameter of such a measurement that the storage tank is not emptied due to the flow of liquid from the storage tank (6) to the container, at least up to the time (Tbs2) the beverage is dispensed to the storage tank in the second preparation cycle (B2).

7. The device (1) according to claim 6, wherein the dispenser (17) has an adjustable diameter.

8. The device (1) according to claim 7, wherein the dispenser (17) comprises a flexible hose and an adjustable clamping mechanism gripping onto the hose.

9. The device (1) according to claim 1, wherein the shutoff valve (21) is adjustable via the control unit (7) on a predefined fixed opening of the dispenser (17).

10. The device (1) according to claim 1, wherein a grinding device (5) for coffee beans is connected to the preparation unit (2).

11. The device (1) according to claim 1, wherein a water supply (23) is connected to the storage tank (6) to supply water to the storage tank.

12. The device (1) according to claim 1, wherein the water supply device (3, 13) is provided with a heating element to heat the water supplied to the preparation unit (2).

\* \* \* \* \*